United States Patent
Liu (10) Patent No.: US 7,668,943 B2
(45) Date of Patent: Feb. 23, 2010

(54) METHOD FOR REAL-TIME SYNCHRONIZING CONFIGURATION DATA BETWEEN ELEMENT MANAGEMENT SYSTEMS AND NETWORK ELEMENTS

(75) Inventor: Chenglong Liu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 10/586,886

(22) PCT Filed: Feb. 6, 2005

(86) PCT No.: PCT/CN2005/000170

§ 371 (c)(1),
(2), (4) Date: Feb. 15, 2008

(87) PCT Pub. No.: WO2005/079004

PCT Pub. Date: Aug. 25, 2005

(65) Prior Publication Data

US 2008/0291944 A1    Nov. 27, 2008

(30) Foreign Application Priority Data

Feb. 12, 2004    (CN) .................. 2004 1 0004981

(51) Int. Cl.
*G06F 15/177* (2006.01)

(52) U.S. Cl. ............... 709/221; 709/224; 709/228

(58) Field of Classification Search .................. None
See application file for complete search history.

(56) References Cited

U.S. PATENT DOCUMENTS

| 6,654,891 | B1 * | 11/2003 | Borsato et al. ................. 726/6 |
| 6,880,086 | B2 * | 4/2005 | Kidder et al. ............... 713/191 |
| 7,031,956 | B1 * | 4/2006 | Lee et al. ........................ 707/3 |
| 7,143,153 | B1 * | 11/2006 | Black et al. ................. 709/223 |
| 2003/0126195 | A1 | 7/2003 | Reynolds et al. |
| 2003/0225884 | A1 * | 12/2003 | Hayden ..................... 709/226 |
| 2005/0201299 | A1 * | 9/2005 | Radi et al. .................. 370/254 |

FOREIGN PATENT DOCUMENTS

| CN | 1377158 A | 10/2002 |
| CN | 1482767 A | 3/2004 |
| EP | 1 065 844 A2 | 1/2001 |
| WO | WO 02/44827 A2 | 6/2002 |

\* cited by examiner

*Primary Examiner*—Donald L Mills
*Assistant Examiner*—Steven Wood
(74) *Attorney, Agent, or Firm*—Conley Rose, P.C.; Grant Rodolph (57) ABSTRACT

The present invention discloses a method for synchronizing the configuration data between an EMS and a NE, which includes: dividing the configuration data in the NE into several layers so that different configuration data layers include different minimum unit configuration data sets; setting a minimum unit identifier word for each configuration data layer to identify the configuration data changes of the configuration data layer; when the configuration data of the NE is changed, changing the corresponding identifier word and sending a configuration changed event notification to EMSs; after receiving the configuration changed event notification, the EMS synchronizes the configuration data according to the event notification. With the present invention, it is possible to make the EMS effectively monitor and synchronize configuration data with the NE in a real-time manner, so that network management efficiency can be improved.

18 Claims, 3 Drawing Sheets

METHOD FOR REAL-TIME SYNCHRONIZING CONFIGURATION DATA BETWEEN ELEMENT MANAGEMENT SYSTEMS AND NETWORK ELEMENTS

FIELD OF THE TECHNOLOGY

The present invention relates to network management techniques in communication systems, more particularly to a method for configuration data real-time synchronization between an Element Management System (EMS) and a Network Element (NE).

BACKGROUND OF THE INVENTION

In communication system networks, network management generally relates to configuration management, performance management and fault management. Configuration management mainly reflects configurations of various types of NEs and important parameters in the network, and provides data for performance management and fault function management. Network management usually adopts polling methods to collect states of the monitored NEs so as to completely and dynamically manage the configuration data of the NEs in the whole network as well as the devices controlling, status checking and setup of the NEs etc., and collects data (parameters and the set status) from each network unit in order to guarantee the accuracy and reasonability of configuration data in the whole network.

Configuration data of the NE reflects current working environment and the operating status of the NE, and can be configured and output through an interface. The EMSs, command line terminals in serial port or remotely TELNET users can all asynchronously or synchronously configure the parameters of the NE and monitor the configuration status of the NE in a real-time manner. These flexible configuration methods make it more difficult for the EMS to synchronize the configuration data with the NE and centrally monitor the NEs. When a single NE has large amounts of data to synchronize or an EMS has to monitor multiple NEs at the same time, if a polling manner is adopted each time for synchronization with each NE, there will be large amounts of data to be done and it will certainly take a long time with low efficiency; not only the performance of the NE and EMS are affected, but also the performance of the whole network, so the method can hardly satisfy the requirement of practical applications.

Actually, after the NE is put into operation, many configuration data will remain relatively stable and can be considered as static data, so the synchronization of the NE with the EMS needs infrequent updating, and even if necessary, it is only needed to update the single NE with configuration changes or the changed part of the configuration of the NE; it is not necessary to update all the NEs in the EMS management domain. Full update operation is only needed in some special cases, such as: the EMS is initially utilized, the EMS has been disconnected from the NE for more than 1 day, configuration lost due to the EMS being restarted, the NE is restarted etc. Therefore, a mechanism should be provided for the EMS to synchronize configuration content with NEs, thereby reducing unnecessary synchronization operations of configuration data and improve network management efficiency.

To solve the above-mentioned problems, two solutions are usually adopted in the prior art:

(1) Providing a row identifier to report how many rows that a configuration table contains.

The configuration parameters of the NE are divided into several independent tables and each one has some properties. Each table is the smallest unit, a row identifier is provided for it, and its value represents the number of rows in the table, so that the configuration changes can be obtained by querying the row identifier.

(2) Providing an identifier of time stamp to report configuration changing time.

The configuration parameters of the NE are divided into some independent tables and each one has several properties. Each table is the smallest unit, a time stamp identifier is provided for it, and its value represents the time when the configuration changes, so that the configuration changes can be obtained by querying the time stamp identifier.

The above-mentioned technical schemes are complicated in implementation, and with poor operability and cannot actually solve the synchronization problem of configuration change.

If the first method is adopted, as there are more than one configuration items, the row identifier cannot fully reflect the configuration changes, for instance: if one row of data is added to the table while another one is deleted from the same table, the row identifier will not change; if no rows of the table is added to or deleted from the table but some configuration items are changed, the row identifier will not change, either.

If the second method is adopted, the same disadvantages still exist:

(A) The synchronization efficiency is not improved while the implementation difficulty is raised. It is too detailed that a configuration changing time is provided for each row of the table, if the EMS wants to know the configuration change of each NE, it must firstly read each time stamp of each table. The method is completely the same as the full synchronization, the only difference is whether to read one data or multiple data, if the NE configuration is changed, it even needs an additional step of pre-inquiry than the full synchronization, so the synchronization efficiency is not increased much and is even poorer in many practical applications.

(B) The EMS can not judge which NE the configuration belongs to. No matter operating on what terminal, time is needed from sending a configuration command to actually executing the command by the NE and then to responding the operation result by the NE, and the time is not a fixed value, so the time value cannot reflect which NE has changed the configuration. Thus the configuration changing value cannot be the condition of starting the synchronization operation.

SUMMARY OF THE INVENTION

Therefore, the present invention is to overcome the above disadvantages of the prior art and provide a method for configuration data real-time synchronization between an Element Management System (EMS) and a Network Element (NE), so that the EMS can correctly trace the configuration data changes of the NE in time, keep synchronous with the NE and provide required data for the EMS.

The present invention is implemented through the following technical solution:

A method for configuration data synchronization between an EMS and an NE, includes the step of: pre-dividing the configuration data of the NE into configuration data layers, so that different configuration data layers include different configuration data sets of the minimum units and a minimum unit identifier word is provided for each configuration data layer to identify the configuration data change in the layer, the method further includes:

if the configuration data of the NE is changed, changing the minimum unit identifier word of the configuration data layer corresponding to the changed configuration data;

the EMS obtaining the changed minimum unit identifier word from the NE;

the EMS comparing the received minimum unit identifier word with the minimum unit identifier word stored in it to determine which configuration data layer the changed configuration data belongs to and the changes of the configuration data, and then the EMS synchronizing the changed configuration data with the corresponding NE according to the analyzing result.

With the present invention it is possible that an EMS effectively monitors and synchronizes configuration data with the NE in a real-time manner. By dividing the configuration data into different layers, the configuration changing scope and the changed configuration data can be accurately located, which can satisfy the configuration data synchronization applications of different NEs; furthermore, when the NEs have some changes, they will inform the EMS actively, so that the EMS can synchronize the configuration data in time, and the network management efficiency is improved.

DETAILED DESCRIPTION OF THE INVENTION

In order to make the present invention clearer, the present invention is described hereinafter with reference to the accompanying drawings and embodiments.

The technical solution of the present invention is:

1. configuration data layer division model design: dividing the configuration data in the NE into several layers so that different configuration data layers include different minimum unit configuration data sets;

2. synchronization configuration interface model design: setting a minimum unit identifier word for each configuration data layer to identify the configuration data changes of the configuration data layer;

3. configuration change synchronization procedure design: including synchronization implementation and strategy of the NE and that of EMS. wherein, synchronization implementation and strategy of the NE includes: when the configuration data of the NE is changed, the NE changes the corresponding identifier word(s) and send a configuration changed event notification to the EMS; the synchronization implementation and the strategy of the EMS includes: after receiving the configuration changed event notification, the EMS synchronizes the configuration data according to the event notification.

The method of the present invention will be illustrated in detail hereinafter based on the above-mentioned basic ideas and with reference to the flowchart shown in FIG. 2.

Figure 2:
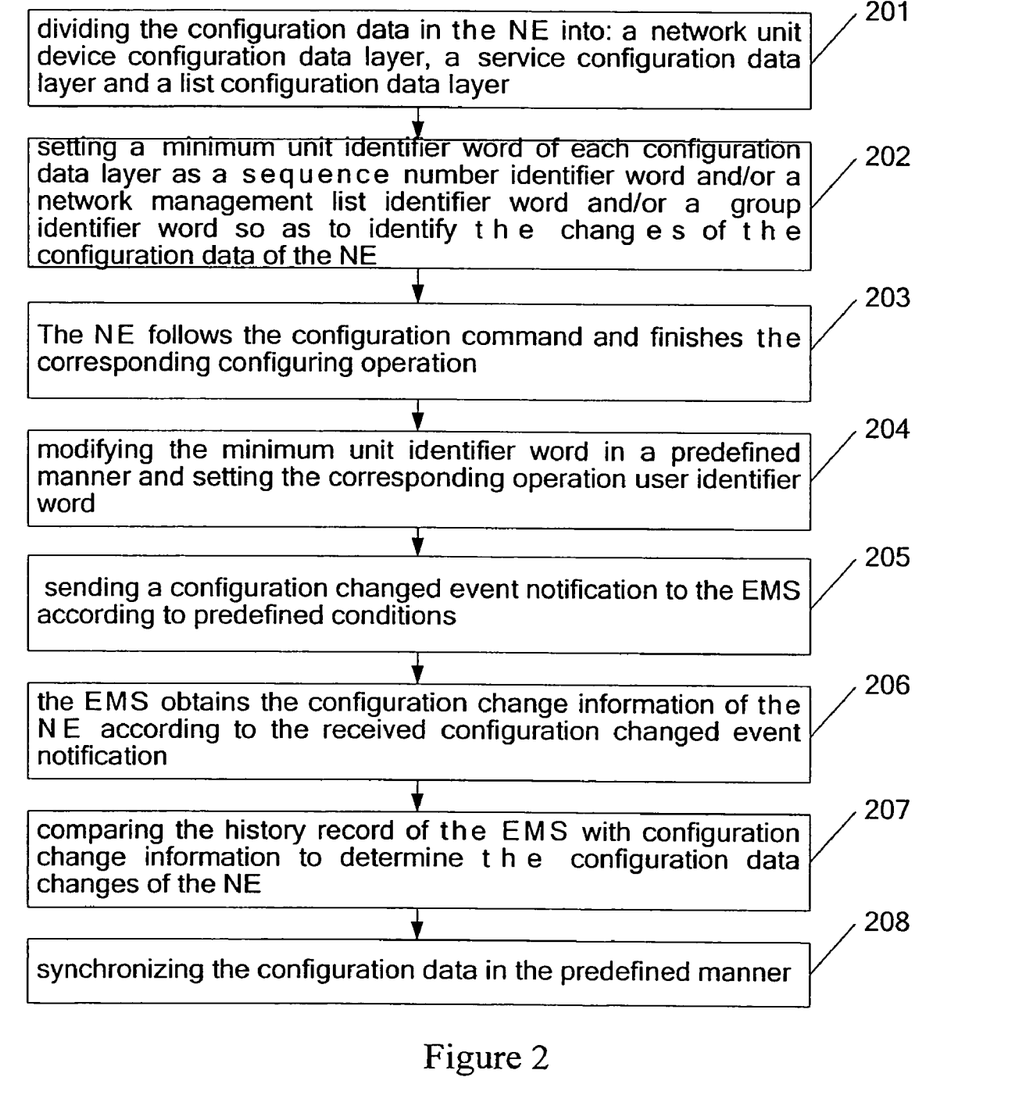
FIG. 2 is a flowchart illustrating a procedure of a preferred embodiment of the present invention.

With reference to FIG. 2, which is a flowchart illustrating the procedure of a preferable embodiment of the present invention, the present invention is further described in detail as follows:

Step 201: dividing the configuration data in the NE into: the NE configuration data layer, the service configuration data layer and the table configuration data layer. wherein, the NE configuration data layer includes all the configuration data of the NE; the service configuration data layer includes the configuration data of different service characteristics; the table configuration data layer includes different configuration data of the table.

Figure 1:
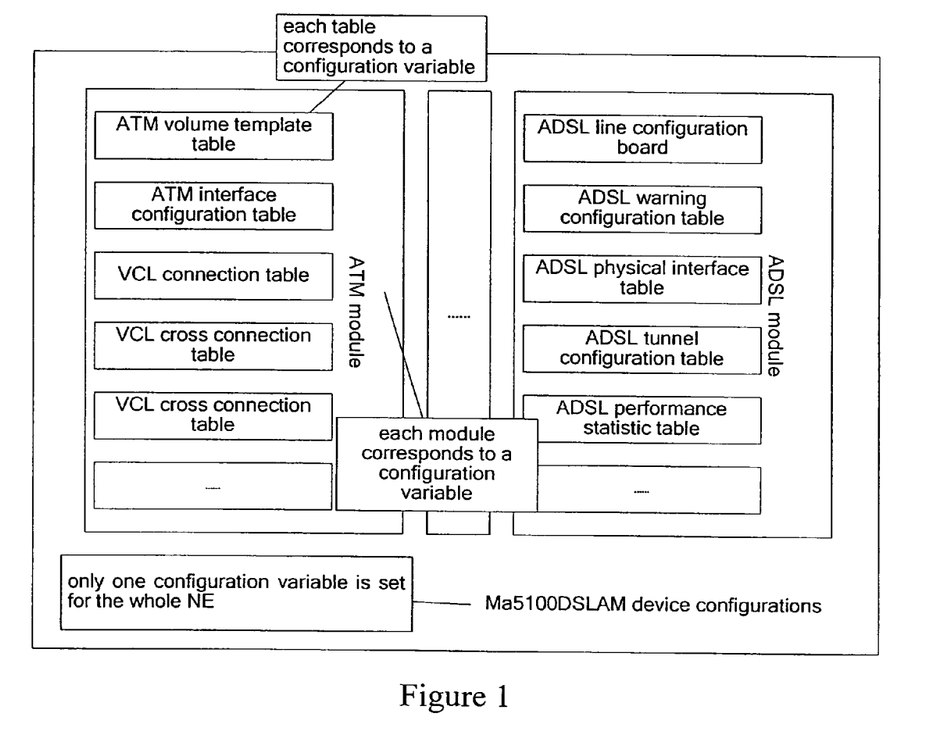
FIG. 1 shows an example of layered configuration data.

When dividing the configuration data in the NE into layers, there are many methods, such as dividing according to service scope, or implementation functions, or network models and so on, or dividing according to different data blocks. For instance, as shown in FIG. 1, the configuration data of the NE can be divided according to the service type into: an Asynchronous Transfer Mode (ATM) interface characteristic, an Asymmetric Digital Subscriber Line (ADSL) interface characteristic, a device management characteristic, an environment monitor characteristic, an Ethernet interface characteristic, a Simple Network Management Protocol (SNMP) characteristic, a Point-to-Point Protocol (PPP) characteristic, etc., wherein each service characteristic corresponds to the corresponding configuration content. Based on these characteristics, the configuration data in the NE is divided into different layers step by step according to certain rules, so that different configuration data layers include different minimum unit configuration data sets, and upper layer's configuration data change information include those of the lower layer.

In the present embodiment, the configuration data in the NE is divided into the following three layers:

①the NE configuration data layer: the layer represents the collection of all the data of the NE, and any change of the configuration data of the NE will lead to the changing of minimum unit identifier word of the layer. If the minimum unit identifier word of the layer is changed, the EMS only knows that configuration data of the NE are changed but does not know the changes, so the synchronization between the EMS and the NE is full synchronization.

② the service configuration data layer: the configuration data of the NE is divided according to the service characteristics and different minimum unit identifier words are set in terms of the different service characteristics. In the layer, the EMS only knows that the service configuration data of the NE are changed but does not know the changes of the service, so the synchronization between the EMS and the NE is full synchronization at service level.

③ the table configuration data layer: on the basis of service characteristics classification, different minimum unit identifier words are set in terms of different tables. In the layer, the EMS knows the changes of the table configuration data of the NE, but does not know the changes of the table, so the synchronization between the EMS and the NE is full synchronization at table level.

The NE can select one or more layers according to practical network structure applications. Although the above-mentioned dividing method is adopted to divide the configuration data of the NE in the present embodiment, it is obvious that a table configuration data layer can be further divided into row content layers on the basis of each service characteristic table, so as to distinguish the situation when the row number is not changed while table nodes are changed, which will have no effect on the whole table. Moreover, the present invention is not confined to the above dividing methods, and can include various transformations and variations, for instance, the configuration data can also be divided into different types corresponding to different synchronization manners. It is hoped that the accompanying claims comprise these transformations and variations without departing from the spirit of the present invention.

Step 202: setting the minimum unit identifier words of each configuration data layer as the sequence number identifier word and/or the network management table identifier word and/or the mixed identifier word so as to identify the changes of the configuration data of the NE.

Each of the data layer divided in step 201 includes at least one minimum configuration data unit. For instance, the highest layer NE configuration data layer includes a minimum unit; the second layer service configuration data layer comprises multiple minimum units like an ATM service, an ADSL service and so on; as to the third layer table configuration data layer, the ATM service includes multiple minimum units like an ATM volume template table, an ATM interface configuration table and so on, the ADSL service includes multiple minimum units like an ADSL row configuration board table, an ADSL warning configuration table and so on. Each minimum unit of each layer is configured with the identifier word to identify the changes of the configuration data in the layer. When the configuration data of the NE is changed, modifying the corresponding identifier word of the configuration data, if more than one layer is adopted, then also modifying the corresponding identifier words of all upper layers containing the configuration data. In this way, the EMS can locate the configuration data that was actually changed by analyzing the identifier words in a descending order step by step, therefore the synchronization operation efficiency is improved.

The three kinds of identifier words in step 202 will be explained hereinafter:

The sequence number identifier word: identifying the minimum configuration unit item with a sequence number. The sequence number starts form 0 and is incremented by 1 (modulo the value threshold) each time the minimum configuration unit being changed. The EMS performs corresponding synchronization by analyzing the sequence number identifier word.

The network management table identifier word: it is a configuration word includes configuration tables of all the network management devices supported by the NE. For instance, each network management device occupies 4 bits of the configuration word and other configuration devices which need no synchronization occupy another 4 bits, to identify the latest configuring operations of network management devices respectively. The configuration word can be a single integer, or multiple integers, or a string and so on. Corresponding bits of the identifier word will be incremented by 1 (modulo 16) each time the minimum configuration unit is changed.

Practically, each network management device can occupy proper bits according to specific applications, not always 4 bits.

The mixed identifier word: this kind of identifier words can include a management user, a modification time identifier and a configuration item together, used to identify which data have been configured by which EMS at what time. This kind of identifier words can also be an assembly of any one or two or three items of management user, modification time identifier and configuration item, and the mixed identifier word is used to identify the network unit configuration changes. The identifier word can be an integer, a string, a table or other formats. The identifier word will be changed each time the minimum configuration unit is changed and the EMS synchronizes the data by analyzing the mixed identifier word.

The NE can select one and/or multiple identifier words to identify the changes of its configuration data. Although the current embodiment enumerates the above-mentioned methods for setting the minimum unit identifiers of configuration data layers, it is obvious that the present invention is not confined to these setting methods, rather it may include various transformations and variations. It is hoped that the accompanying claims comprise these transformations and variations without departing from spirit of the present invention.

Figure 3:
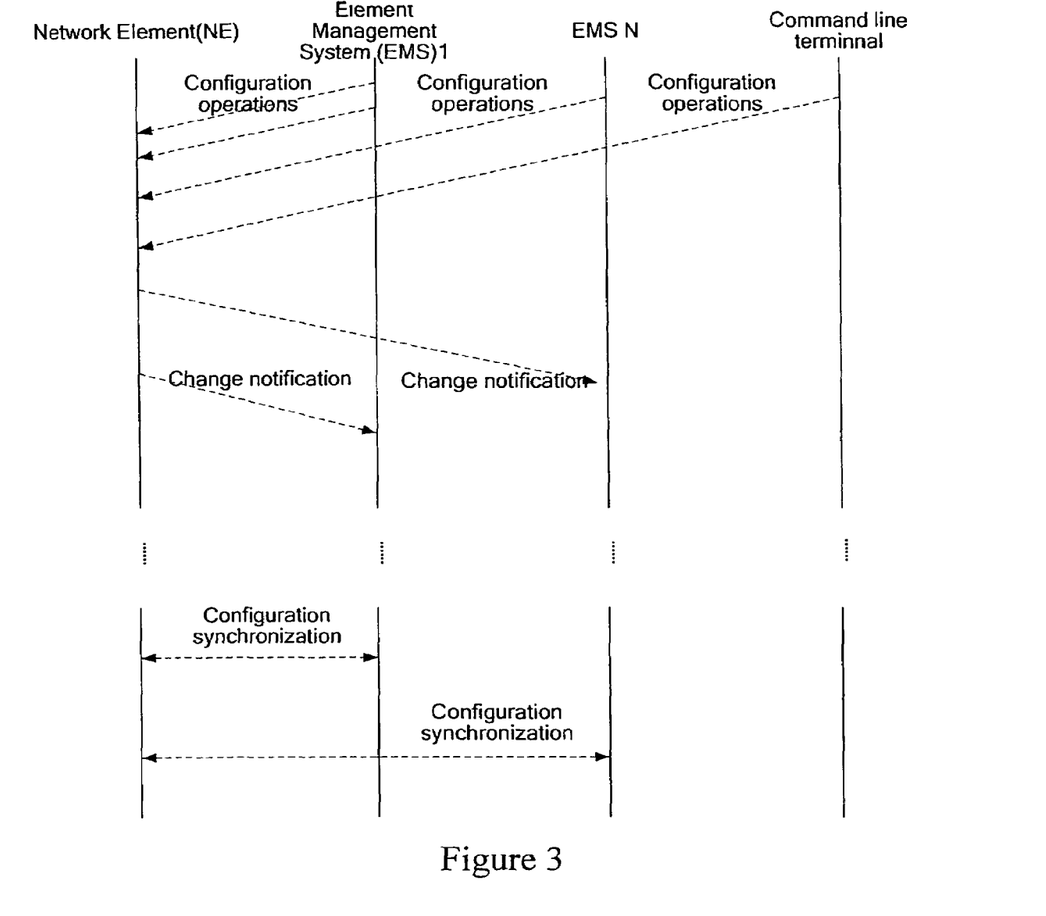
FIG. 3 is a schematic diagram illustrating the procedure of synchronizing the configuration data when there are multiple EMSs in the present invention.

Step 203: the NE receives the configuration command and finishes the corresponding configuring operation. As to one NE, there may be multiple devices configuring it, as shown in FIG. 3. Therein, some devices need to manage the configuration of the whole network and remain synchronous with the configuration data in the NE, such as the EMS; some devices can only configure the NE and have no management privilege, such as configuration terminals. The configuration command in the step comprises the configuration commands from all devices configuring the NE.

Step 204: the NE modifies the minimum unit identifier word in a predefined manner and sets the corresponding operation user identifier word. The operation user identifier word indicates which EMS has reconfigured which NE. Of course, the operation also can be performed in step 202 by setting the operation user identifier word in the minimum unit identifier word, in that way, the NE just needs to modify the minimum unit identifier word in the predefined manner.

Step 205: the NE sends the configuration changed event notification to the EMSs according to predefined conditions. These predefined conditions are the synchronization implementing strategies for the changes of the NE. The configuration changed event notification comprises: the latest minimum unit identifier word and the above-mentioned operational user identifier word. the EMSs refer to all the EMSs that are related to the NE and need to synchronize.

According to different application environments, the NE may store the configuration data in FLASH, hard disk, Static Random Access Memory (SRAM) and so on to update the configuration data. In the present invention, the configuration changed event notification is not sent to the EMSs each time it receives a configuration command and finishes the corresponding configuration, but follows the following conditions:

After finishing the configuration, the NE postpones sending the configuration changed event notification for a preconfigured period of time, if the configuration is changed again during the preconfigured period of time, the configuration changed event notification will not be sent until the new configuration(s) is (are) finished, then sends the configuration changed event notifications together;

If the NE continuously receives configuration commands from multiple different management devices or a batch processing configuration command from a single management device, it will send only one configuration changed event notification to the EMSs after all the corresponding configurations are finished. For instance, a command line terminal executes a batch-processing configuration on the NE, and the command modifies the configurations of 1000 interfaces, here the NE should control the generation of event notifications, and after finishing the batch-processing sends out one event notification instead of 1000 separate event notifications.

Step 206: the EMSs obtain the configuration changing information of the NE according to the received configuration changed event notification. It can be seen from step 205 that, in the embodiment of the present invention, configuration changed event notification includes the latest minimum unit identifier word and the operation user identifier word:

By using the minimum unit identifier word, the EMS compares the received minimum unit identifier word with that recorded in itself, if they are not identical, it can be deduced that the data configuration layer corresponding to the minimum unit identifier word is changed and the changes of the configuration data can be determined according to changes of the minimum unit identifier word;

according to the operation user identifier word, the EMS can determine which EMS has changed the configuration data of the NE, if it is itself, because the EMS has synchronized it while changing the configuration data of the NE, there is no need to perform the subsequent synchronization; if it is not itself, subsequent synchronization process is needed. Therein, the process of determining the EMS is just a solution adopted by the preferable embodiment of the present invention, other embodiments of the present invention can also be implemented without determining the EMS at all.

Step 207: comparing the history record of the EMS with the configuration changing information to determine the configuration data changes of the NE.

As to the above-described step 206 to step 207, an alternative method can also be adopted, wherein the EMS actively inquires about the latest minimum unit identifier word of the NE, compares the latest minimum unit identifier word with the one recorded in itself to determine the changes of the NE. There are many inquiry methods for the EMS, such as timing inquiry, polling and so on, which are not described herein.

Step 208: the NE synchronizes the configuration data in a predefined manner according to the changes of the NE. There are many ways for the EMS to perform synchronization, such as:

Timing inquiry: synchronizing the configuration data at a specified time, usually when the NE and the EMS are idle.

Instant synchronization: synchronizing the configuration data immediately when receiving the configuration changed event notification, and the manner is usually adopted for important NE or important data so as to guarantee the data is updated in time.

Postponed synchronization: postponing the synchronization for a predefined period of time after receiving the configuration changed event notification and then synchronizing the configuration data, in order to avoid excessively occupying network management resources, the EMS filters the frequently transmitted configuration changed event notifications. For instance, during a certain period of time, only the last one of the multiple configuration changed event notifications sent by the same NE is processed.

Manual synchronization: setting manual synchronization command and synchronizing the configuration data according to the manual synchronization command at any moment. On-spot manual monitor function is provided, when the manual synchronization command is input or the synchronization button is pushed, the EMS will start to synchronize the configuration data according to configuration data changes of the NE.

Here is a practical application of the present invention in a certain Digital Subscriber Line Access Multiplexer (DSLAM) product:

(1) Communicating with the EMS: acquiring the configuration data by using 10 Mbps independent network management tunnel, Simple Network Management Protocol (SNMP) request and acknowledgement mode;

(2) configuring data: there are 8 characteristics, each characteristic has 20 tables, each table is divided into 20 configuration fields and each table has 50 rows averagely, so the total number of configuration data points is 8×20×20×50=16000.

If the prior art is adopted:

In normal condition, full synchronization of the configuration data for a single NE costs about 10~15 minutes. Accordingly, even if a central EMS is operated for the whole 24 hours a day to synchronize the data, only (60/10)×24=144 NEs can be synchronized, and even if 10 more threads are opened for each EMS specially for configuration data synchronization, it still cannot satisfy the demand of large capacity of the DSLAM product and real-time monitoring on configuration change of the EMS.

If the technical solution of the present invention is adopted:

There are several situations for the configuration change of a normally operated NE:

Configuration all changed: the situation needs full synchronization just like adding a new NE and only happens less than 0.1% a day, which means only one in a thousand of the original NEs needs full synchronization.

Configuration not changed at all: configuration data of the NE is not to be and is not allowed to be frequently modified after the system is put into operation normally. Configuration information of more than 95% of all the NEs in the whole network is not changed.

Configuration partly changed: configuration information of less than 5% of the NEs needs to be changed because of malfunction, optimization operation, new services, update and other reasons.

So generally speaking, by adopting technical solution of the present invention and using configuration data layers and identifier words, the EMS can differentiate the synchronization operations of the configuration data in the NEs, thereby basically satisfying the configuration synchronization demand of 1200 NEs in the management domain in 1 hour.

While the present invention has been described with reference to preferable embodiments, the present invention is not confined to the embodiments. It is generally understood by those skilled in the field that various changes may be made and equivalents may be substituted without departing from the scope of the present invention.

The invention claimed is:

1. A method for synchronizing configuration data between an Element Management System (EMS) and a Network Element (NE), wherein the configuration data of the NE is divided into a plurality of layers such that different layers comprise different configuration data sets of minimum units, and wherein a minimum unit identifier word is provided for each layer to identify any changes to the configuration data in the layer, the method comprising:

if the configuration data of the NE is changed, the NE changing the minimum unit identifier word of the layer corresponding to the changed configuration data;

the EMS obtaining the changed minimum unit identifier word from the NE; and the EMS comparing the obtained minimum unit identifier word with a minimum unit identifier word stored in the EMS to determine which layer is associated with the changed configuration data; and the EMS synchronizing the changed configuration data of corresponding NE with the EMS;

wherein the minimum unit identifier word comprises:

a sequence number identifier word that identifies a minimum configuration unit item with a sequence number;

a network management table identifier word that is a configuration word and comprises configuration tables of all the network management devices supported by the NE;

a mixed identifier word;

or any combination thereof;

wherein the mixed identifier word comprises a configuration device identifier, a changing time identifier, a configuration item identifier, or any combination thereof.

2. The method according to claim 1, wherein the layers comprise an NE configuration data layer, a service configuration data layer, and a table configuration data layer; and
wherein the NE configuration data layer represents the collection of all the data of the NE, the configuration data of the NE is divided into the service configuration data layer according to a service characteristic, and the table configuration data layer is determined on the basis of service characteristics classification.

3. The method according to claim 2, further comprising:
dividing the configuration data in the table configuration data layer into row content layers.

4. The method according to claim 1, wherein the step of changing the minimum unit identifier word of the configuration data layer corresponding to the changed configuration data comprises:
determining which layer is associated with the changed configuration data;
modifying the minimum unit identifier word of the layer associated with the changed configuration data and any higher layers.

5. The method according to claim 1, further comprising:
determining which EMS has changed the configuration data of the NE;
setting an operation user identifier word corresponding to the EMS that changed the configuration data;
the EMS obtaining the operation user identifier word from the NE; and
the EMS comparing the received operation user identifier word with the operation user identifier word stored in the EMS to judge whether it is the EMS that has changed the configuration data, and if not, executing the step of synchronizing the configuration data.

6. The method according to claim 5, wherein the minimum unit identifier word assigned for each configuration data layer further comprises the operation user identifier word;
if the configuration data of the NE is changed, the NE determining which layer is associated with the changed configuration data;
modifying the minimum unit identifier words of the layer associated with the changed configuration data and any higher layers; and
modifying the operation user identifier words comprised in the minimum unit identifier words.

7. The method according to claim 1, wherein the NE is in communication with a plurality of EMSs, wherein the NE sends a configuration changed event notification to the EMSs, and wherein the configuration changed event notification comprises the changed minimum unit identifier word.

8. The method according to claim 7, wherein the step of the NE sending configuration changed event notification to the EMSs comprises:
the NE postponing sending the configuration changed event notification to the EMSs for a predefined period of time; and
if the configuration is changed again during the predefined time, the NE will not send the configuration changed event notification until at least one new change is finished.

9. The method according to claim 7, wherein the step of the NE sending the configuration changed event notification to the EMSs comprises:
if the NE continuously receives configuration commands from multiple different EMSs or a batch processing configuration commands from a single EMS, the NE will not send the configuration changed event notification to the EMSs until all the corresponding configurations are finished.

10. The method according to claim 1, wherein the EMS actively queries the NE for the minimum unit identifier word.

11. The method according to claim 1, wherein the EMS compares the obtained minimum unit identifier word with a minimum unit identifier word stored in the EMS to determine which layer is associated with the changed configuration data, and wherein the configuration data changes comprises:
the EMS comparing the obtained minimum unit identifier word with the minimum unit identifier word stored in the EMS;
if the obtained minimum unit identifier word and the minimum unit identifier word stored in the EMS are not identical, determining that the configuration data of the layer corresponding to the minimum unit identifier word is changed, and the configuration data changes according to a change detail of the minimum unit identifier word.

12. The method according to claim 1, wherein the step of the EMS synchronizing the changed configuration data of the corresponding NE comprises:
the EMS comparing the changed configuration data with that stored in a history record of the EMS to determine the changes of the configuration data, and then synchronizing the configuration data according to the changes of the configuration data of the NE.

13. The method according to claim 12, wherein the step of synchronizing the configuration data by the EMS according to the changes of the configuration data of the NE comprises:
the EMS synchronizing the configuration data at a specified time.

14. The method according to claim 12, wherein the step of synchronizing the configuration data by the EMS according to the changes of the configuration data of the NE comprises:
the EMS synchronizing the configuration data immediately in response to receiving the changed minimum unit identifier word and an operation user identifier word.

15. The method according to claim 12, wherein the step of synchronizing the configuration data by the EMS according to the changes of the configuration data of the NE comprises:
after receiving the changed minimum unit identifier word and an operation user identifier word, the EMS delaying a predefined period of time before synchronizing the configuration data.

16. The method according to claim 12, wherein the step of synchronizing the configuration data by the EMS according to the changes of the configuration data of the NE comprises:
setting a manual synchronization command; and
the EMS synchronizing the configuration data according to the manual synchronization command.

17. A method comprising:
determining whether a configuration data within a network element (NE) comprises a change, wherein the configuration data is divided into a plurality of layers, and wherein each layer is associated with one of a first plurality of words that each identify any changes to the associated layer;
determining which EMS has changed the configuration data of the NE;
setting an operation user identifier word corresponding to the EMS that changed the configuration data, wherein the first words comprise the operation user identifier word;

if the configuration data of the NE is changed, the NE determining which layer is associated with the changed configuration data;

changing the first words associated with the layers that comprise the change when the configuration data comprises a change;

changing the operation user identifier words comprised in the first words;

sending the first words but not the change to an Element Management System (EMS), wherein the EMS compares the first words to a plurality of second words to judge whether the EMS has changed the configuration data, and if not, initiates a synchronization process.

18. The method according to claim 1, wherein the minimum unit identifier word represents the changed configuration data but does not comprise the changed configuration data.

* * * * *

UNITED STATES PATENT AND TRADEMARK OFFICE
CERTIFICATE OF CORRECTION

PATENT NO. : 7,668,943 B2 Page 1 of 1
APPLICATION NO. : 10/586886
DATED : February 23, 2010
INVENTOR(S) : Chenglong Liu It is certified that error appears in the above-identified patent and that said Letters Patent is hereby corrected as shown below:

Claim 4, col. 9, line 21; after "configuration data;", add the word "and"

Signed and Sealed this

Eighteenth Day of May, 2010

David J. Kappos
*Director of the United States Patent and Trademark Office*